2,902,494
Patented Sept. 1, 1959

2,902,494
CARBOXYALKYL DERIVATIVES OF POLYHYDRO-PHENANTHRENE CARBOXYLIC ACIDS

Roy H. Bible, Jr., Morton Grove, Ill., assignor to G. D. Searle & Co., Chicago, Ill., a corporation of Delaware No Drawing. Application June 17, 1957
Serial No. 666,246

9 Claims. (Cl. 260—343.2)

This invention relates to polyhydrophenanthrene carboxylic acids and esters, including intramolecular esters, thereof. It is particularly concerned with compounds which can be represented by the general structural formula

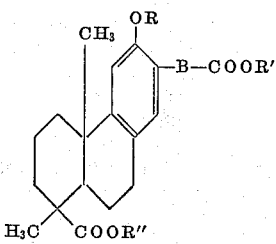

and with lactones related thereto. In this structural formula R, R′, and R″ can each represent hydrogen or a lower alkyl radical. R, R′, and R″, when they represent lower alkyl radicals, can be selected from among such groups as methyl, ethyl, propyl, butyl, amyl, hexyl, heptyl, octyl, and branched-chain isomers thereof. The term B represents a lower alkylene radical, defined herein as an alkylene radical containing fewer than seven carbon atoms. Thus, B can represent the methylene radical, or a polymethylene radical such as ethylene, trimethylene, tetramethylene, pentamethylene or hexamethylene. B can also represent an alkylene radical conferring a branched structure upon the resulting molecule, such as 1,2-propylene

1,2-butylene

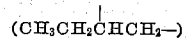

2,3-amylene

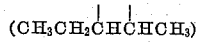

and isomers and homologs thereof.

Starting materials useful in the manufacture of compounds of the present invention are the alkyl O-alkyl-7-alkanoylpodocarpates of the general structural formula

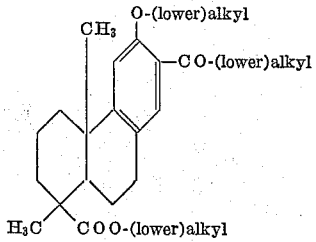

Upon heating such an alkyl O-alkyl-7-alkonyl-podocarpate with sulfur and morpholine, the product obtained is a morpholide of a thio acid, and corresponds to the structural formula

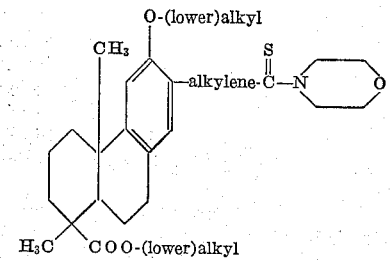

These morpholides, as well as the free phenols and carboxylic acids related thereto, are useful antioxidants and ultraviolet shields. As they exhibit high absorption of radiation in the wavelength range of 280–300 millimicrons, their incorporation in non-toxic oils provides effective sunburn screens.

When a morpholide of the foregoing formula is subjected to hydrolysis in a medium comprising sulfuric acid, acetic acid and water, the compound obtained contains a carboxyalkyl substituent at position 7 which has the same number of carbon atoms as the 7-alkanoyl group in the compound employed as a starting material.

An alternate method of synthesis, particularly useful for the manufacture of compounds of this invention in which the term B represents a branched alkylene radical, comprises the catalytic hydrogenation of a podocarpic acid derivative having at position 7 a substituent of the type

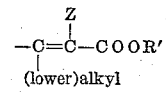

wherein R′ is defined as before and Z is hydrogen or a lower alkyl radical. Unsaturated derivatives of this type are provided by copending application Serial No. 476,065, filed December 17, 1954, now abandoned.

Compounds of this invention in which R, R′, and R″ all represent hydrogen are prepared by heating a corresponding ether or ester with pyridine hydrochloride and pouring the reaction mixture into water. When there is a carboxylic substituent at position 7 of such chain length that a stable lactone ring can be formed by intramolecular esterification with a free hydroxy group at position 6, this lactone can become the predominant species of reaction product. For example, upon reaction of 1,4a-dimethyl-1-methoxycarbonyl-6-methoxy - 1,2,3,4, 4a,9,10,10a-octahydrophenanthrene-7-propionic acid with pyridine hydrochloride, the principal reaction product is the lactone of 1,4a-dimethyl-1-carboxy-6-hydroxy-1,2,3,4, 4a,9,10,10a - octahydrophenanthrene - 7 - propionic acid. This lactone is readily converted to the free hydroxy acid as described hereinafter. In general the 5- and 6-membered lactones of this invention, when free of chain branching which provides a steric impediment to their formation, are relatively more stable than the free hydroxy acids to which they are related. Because of the facile interconversion of these lactones and their related hydroxy acids, they are equivalents for the purposes of this invention.

Selective hydrolysis of ester and ether groups in the compositions of this invention can also be achieved. Mild basic conditions cause hydrolysis only of an ester group in the substituent at position 7, while more drastic basic conditions such as potassium hydroxide in aqueous diethylene glycol or aqueous ethanol at about 150–160° C. cause hydrolysis of all ester groups present. Hydrolysis of a 6-alkoxy group is achieved by refluxing the compound in a mixture of acetic acid and hydrobromic acid, or by heating it with aluminum chloride in chlorobenzene.

The compounds of this invention have valuable pharmacological properties. Specifically, they are hypotensive agents, and are consequently useful in the treatment of states of abnormally elevated blood pressure. They also have hormonal properties, and are active as estrogens. They are useful anti-inflammatory agents, effective in relieving a wide range of inflammatory conditions. Thus, they produce anti-inflammatory responses in relieving the hyperemia associated with inflammation of the iris, in inhibiting the formation of a granuloma resulting from a tissue irritation, and in reducing local edema formation of inflammatory origin.

This invention will appear more fully from the examples which follow. These examples are set forth by way of illustration only, and it will be understood that the invention is not to be construed as limited in spirit or in scope by the details contained therein, as many modifications in materials and methods will be apparent from this disclosure to those skilled in the art. In these examples temperatures are given in degrees centigrade (° C.), pressures in millimeters (mm.) of mercury, and quantities of materials in parts by weight.

*Example 1*

An intimate mixture of 22.9 parts of methyl O-methyl-7-acetylpodocarpate, 3.2 parts of sulfur and 8.7 parts of morpholine is heated under reflux for 10 hours and then poured, with stirring, into several times its volume of water. The precipitated product is dissolved by extraction with ether, and the ethereal solution is washed with several small portions of water and concentrated to dryness under reduced pressure. The residue in a minimum quantity of a 20 volume percent soluiton of benzene in petroleum ether is poured onto a chromatography column prepared from 1700 parts of silica. The column is eluted with mixtures of benzene and petroleum ether containing gradually increasing proportions of benzene, with benzene, and then with mixtures of benzene and ethyl acetate containing gradually increasing proportions of ethyl acetate. While the exact concentrations at which particular compounds are eluted from the column are subject to variations dependent upon such factors as solvent volumes employed and activity of the silica, there are readily obtained at low concentrations (2–10 volume percent) of ethyl acetate in benzene unreacted methyl O-methyl-7-acetylpodocarpate, followed by the morpholide of 1,4a-dimethyl - 1 - methoxycarbonyl - 6 - methoxy - 1,2,3,4,4a,-9,10,10a - octahydrophenanthrene - 7 - ethanethionic acid. Upon crystallization from aqueous methanol, eluate residues containing predominantly the latter compound melt at about 170° C. or higher. The purified compound obtained by additional crystallizations from aqueous methanol melts at about 177–180° C. It has the structural formula

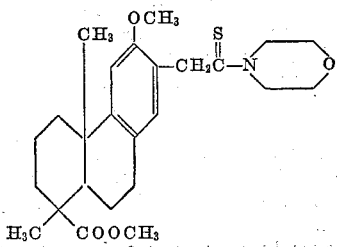

This compound (3.1 parts) is added to a hydrolytic medium prepared from 6.4 parts of concentrated sulfuric acid, 5.2 parts of water and 24.3 parts of acetic acid, and the mixture is heated under reflux for 5 hours. A small amount of insoluble material is removed by filtration of the cooled mixture, and the filtrate is diluted with water until separation of the reaction product is complete. This product is collected and subjected to a preliminary purification by reprecipitation with mineral acid from a 2% sodium hydroxide solution. Upon crystallization from aqueous methanol there is then obtained 1,4a-dimethyl-1-methoxycarbonyl - 6 - methoxy - 1,2,3,4,4a,9,10,10a - octahydrophenanthrene-7-acetic acid which melts at about 145–147° C. and has the structural formula

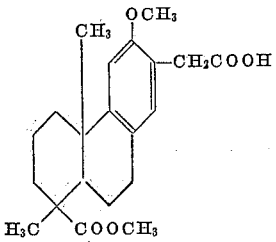

*Example 2*

A stirred mixture of 302.4 parts of methyl O-methylpodocarpate and 1100 parts of chlorobenzene is maintained at about 10° C. and treated by the gradual addition of 273 parts of aluminum chloride. The mixture is stirred for 10 minutes after the addition of the aluminum chloride has been completed, and then there is gradually added a solution of 185 parts of propionyl chloride in 155 parts of chlorobenzene. The stirred reaction mixture is maintained at about 10–15° C. during this period of addition and for 3 hours thereafter, after which the reaction mixture is allowed to stand at room temperature for 16 hours. It is then poured into 1500 parts of ice water containing 210 parts of concentrated hydrochloric acid. The chlorobenzene is removed by distillation with steam, and the residual aqueous suspension is chilled until crystallization is complete. The solid product is collected and purified by repeated crystallizations from methanol to yield methyl O-methyl-7-propionylpodocarpate melting at 102–103° C.

*Example 3*

An intimate mixture of 17.9 parts of methyl O-methyl-7-propionylpodocarpate, 2.4 parts of sulfur and 6.54 parts of morpholine is heated under reflux for 10 hours. The mixture is diluted while still hot with about 300 parts of benzene; 50 parts of water is added, and after thorough mixing, insoluble material is removed by filtration. The benzene phase is separated from the filtrate, washed with small portions of water, dried, filtered, and concentrated to dryness under reduced pressure. Ether (about 350 parts) is added to the residue, and a distillation is carried out until about 250 parts of the added ether has been removed by volatilization. The solid remaining in the ethereal suspension at this point is collected, washed with additional small portions of ether, and crystallized from aqueous methanol to afford the morpholide of 1,4a-dimethyl-1-methoxycarbonyl-6-methoxy-1,2,3,4,4a,9,10,10a, octahydrophenanthrene-7-propanethionic acid which melts at about 178–180° C. and has the structural formula

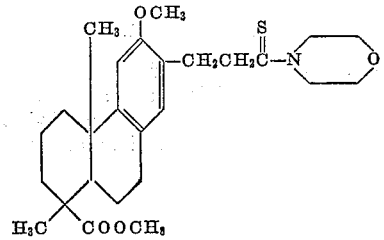

Fifty parts of this compound is added to a hydrolytic medium prepared from 103 parts of concentrated sulfuric acid, 83.6 parts of water and 392 parts of acetic acid, and the mixture is heated under reflux for 5 hours. A small amount of insoluble material is removed by filtration of the cooled mixture. The filtrate is diluted with water until separation of the reaction product is complete, and this product is collected and subjected to a preliminary purification by reprecipitation with mineral acid from a 2% sodium hydroxide solution. By several crystallizations from aqueous methanol there is then obtained 1,4a-dimethyl-1-methoxycarbonyl-6-methoxy-1,2,3,4,4a,9,10,10a - octahydrophenanthrene - 7 - propionic acid which melts at about 143–144.5° C. and has the structural formula

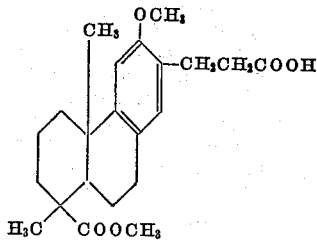

Example 4

By the procedure of Example 2, with the substitution of 241 parts of valeryl chloride for the propionyl chloride, there is obtained methyl O-methyl-7-valerylpodocarpate. Substitution of 25.7 parts of this compound for the methyl O-methyl-7-acetylpodocarpate in the procedure of Example 1 affords the morpholide of 1,4a-dimethyl-1-methoxycarbonyl - 6 - methoxy-1,2,3,4,4a,9,10,10a - octahydrophenanthrene-7-pentanethionic acid, which is converted to 1,4a-dimethyl-1-methoxycarbonyl-6-methoxy - 1,2,3,4,4a,9,10,10a-octahydrophenanthrene-7-pentanoic acid upon treatment with the sulfuric acid-acetic acid hydrolysis medium as described in Example 1.

Example 5

A solution of 4 parts of 1,4a-dimethyl-1-methoxycarbonyl-6-methoxy - 1,2,3,4,4a,9,10,10a - octahydrophenanthrene-7-propionic acid, 8 parts of potassium hydroxide, 8 parts of water and 20 parts of ethanol is maintained in a high pressure reaction vessel at 150–160° C. for about 13 hours. The cooled mixture is diluted with several times its volume of water, filtered from a small amount of insoluble material, and acidified with hydrochloric acid. The precipitated product is collected and crystallized several times from aqueous methanol to afford 1,4a-dimethyl-1-carboxy-6-methoxy - 1,2,3,4,4a,9,10,10a - octahydrophenanthrene-7-propionic acid which melts at about 194–198° C. and has the structural formula

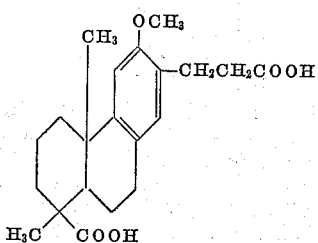

Example 6

A solution of 3.6 parts of 1,4a-dimethyl-1-methoxycarbonyl-6-methoxy - 1,2,3,4,4a,9,10,10a - octahydrophenanthrene-7-acetic acid in 15 parts of methanol is neutralized with 10% sodium hydroxide solution. Butyl bromide (1.4 parts) is added, and the mixture is heated under reflux for 3 hours, cooled, diluted with several times its volume of water, and extracted with ether. The ethereal extract is washed rapidly with cold 10% sodium hydroxide solution and then with several small portions of water. Upon concentration of the dried ethereal extract there is obtained a non-volatile residue of the butyl ester of 1,4a-dimethyl-1-methoxy-carbonyl-6-methoxy - 1,2,3,4,4a,9,10,10a-octahydrophenanthrene-7-acetic acid which exhibits infrared absorption maxima at about 5.85, 6.20, 6.35, and 6.66 microns and has the structural formula

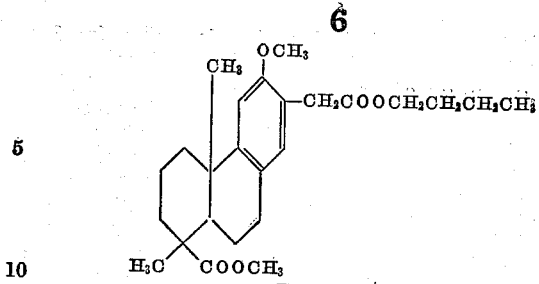

Example 7

A solution of 35 parts of 1,4a-dimethyl-1-carboxy-6-methoxy - 1,2,3,4,4a,9,10,10a - octahydrophenanthrene-7-propionic acid in 150 parts of methanol is made slightly basic with 10% sodium hydroxide solution. Diethyl sulfate (32 parts) is added, and after the initial reaction is over the mixture is heated under reflux for 5 minutes. It is then cooled, made slightly basic with 10% sodium hydroxide solution, treated with an additional 32 parts of diethyl sulfate, and again heated under reflux for 5 minutes. It is then chilled, made distinctly basic with 10% sodium hydroxide, and poured into several times its volume of water. The esterified product is rapidly extracted with ether, and the ethereal solution is washed with dilute sodium hydroxide solution and then with water until the washings are neutral. Upon concentration of the dried ether solution there is obtained a non-volatile residue of the ethyl ester of 1,4a-dimethyl-1-ethoxycarbonyl - 6-methoxy - 1,2,3,4,4a,9,10,10a-octahydrophenanthrene-7-propionic acid which has ultraviolet absorption maxima at about 281 and 287 millimicrons, each with a molecular extinction coefficient of about 3200. The structural formula is

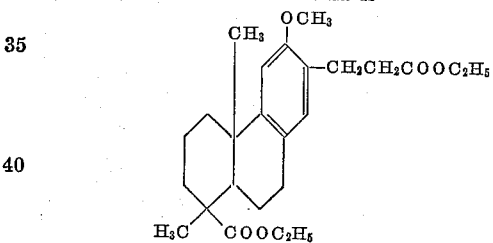

Example 8

An intimate mixture of 5 parts of 1,4a-dimethyl-1-methoxycarbonyl - 6 - methoxy-1,2,3,4,4a,9,10,10a-octahydrophenanthrene-7-propionic acid and 100 parts of pyridine hydrochloride is rapidly heated in a distillation apparatus until the temperature of the distillate reaches about 200° C. A slow distillation is continued for an additional 20 minutes, after which the residue is poured, with stirring, into 800 parts of hot water. The precipitated product is collected, washed with water, dried, and sublimed at a temperature of about 225–260° C. and a pressure of about 0.03 mm. By crystallization of the sublimate from a mixture of chloroform and methanol there is obtained the lactone of 1,4a- dimethyl-1-carboxy-6-hydroxy - 1,2,3,4,4a,9,10,10a - octahydrophenanthrene-7-propionic acid which melts at about 245–250° C. This compound shows ultraviolet absorption maxima at 273.8 and 282.5 millimicrons, with respective molecular extinction coefficients of about 1570 and 1600. The structural formula is

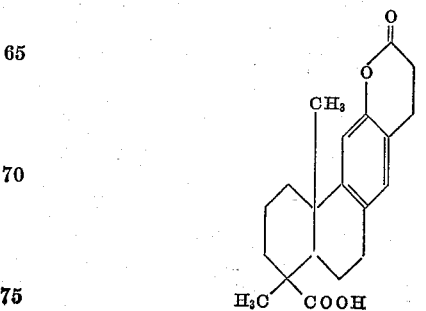

This lactone (1 part) is heated under reflux for 3 minutes with 30 parts of 10% sodium hydroxide solution. The solution is cooled by means of an external ice bath and acidified with dilute hydrochloric acid. The precipitated product is collected and dissolved in ether; the ethereal solution is dried and concentrated under reduced pressure to afford a voluminous, solid residue of 1,4a-dimethyl-1-carboxy-6-hydroxy-1,2,3,4,4a,9,10,10a-octahydrophenanthrene-7-propionic acid. This compound can be further purified by crystallization from a mixture of ethyl acetate and petroleum ether. Its behavior in a melting point determination is dependent upon the temperature of the bath at the time of insertion and the rate of heating. Typically, it undergoes a transition point with partial fusion at about 170° C. or lower, and then resolidifies. Upon further heating it exhibits the melting point of the lactone form. The free dicarboxylic acid has an ultraviolet absorption maximum at 283 millimicrons with a molecular extinction coefficient of about 3220, and a shoulder at 288 millimicrons. The structural formula is

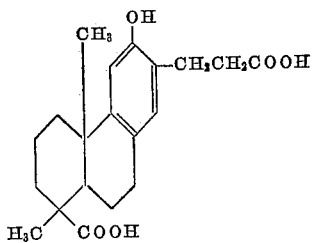

*Example 9*

A solution of 33 parts of the lactone of 1,4a-dimethyl-1-carboxy-6-hydroxy-1,2,3,4,4a,9,10,10a-octahydrophenanthrene-7-propionic acid and 8 parts of sodium hydroxide in 200 parts of 80% aqueous methanol is heated under reflux for 15 minutes. It is then cooled; 32 parts of diethyl sulfate is added, and the mixture is heated under reflux for 5 minutes. It is then chilled with an external ice bath, made basic with dilute sodium hydroxide solution, and rapidly extracted with ether. The ethereal extract is washed with several small portions of water and then concentrated to yield a residue of the ethyl ester of 1,4a-dimethyl-1-ethoxycarbonyl-6-ethoxy-1,2,3,4,4a,9,10,10a-octahydrophenanthrene-7-proprionic acid. This compound exhibits a specific rotation of about +100° in ethanol solution and has the structural formula

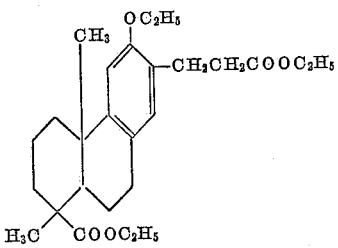

*Example 10*

Twenty parts of methyl O-methyl-7-propionylpodocarpate is dissolved in 550 parts of concentrated sulfuric acid. The solution is made as quickly as possible by stirring and breaking up any large solid particles. This dark colored solution is cautiously poured with efficient stirring into 1500 parts of water. The mixture is allowed to stand until the precipitate has solidified. The solid is dissolved in 80 parts of methanol, and the resulting solution is poured with stirring into 1500 parts of 3% sodium hydroxide. Diatomaceous earth is added to the basic solution, and the mixture is filtered. The filtrate is acidified and the cream-colored precipitate is collected and crystallized several times from aqueous methanol. This product melts at about 167.5–171° C. and is O-methyl-7-propionyl-podocarpic acid.

*Example 11*

A mixture of 7.4 parts of O-methyl-7-propionylpodocarpic acid, 1.49 parts of sulfur, and 4.05 parts of morpholine is heated under moderate reflux for 15 hours. The reaction mixture is taken up in 310 parts of benzene. Ten parts of activated charcoal is added and the mixture is stirred for 5 minutes and filtered. The filtrate is taken to dryness by distillation of the solvent under reduced pressure. The residue is extracted with 180 parts of ether, and the ether extract is discarded. The residue is crystallized several times from methanol to afford the morpholide of 1,4a-dimethyl-1-carboxy-6-methoxy-1,2,3,4,4a,9,10,10a-octahydrophenanthrene-7-propanethionic acid as a light yellow crystalline material which melts at about 233–235° C. and has the structural formula

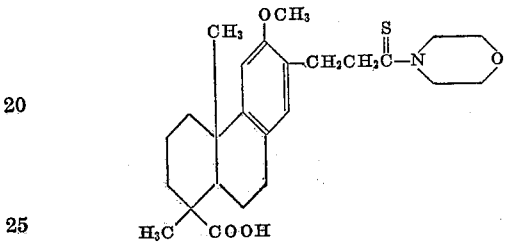

*Example 12*

Treatment of 1,4a-dimethyl-1-methoxycarbonyl-6-methoxy-1,2,3,4,4a,9,10,10a-octahydrophenanthrene-7-acetic acid with pyridine hydrochloride according to the procedure of Example 8 yields the lactone of 1,4a-dimethyl-1-carboxy-6-hydroxy-1,2,3,4,4a,9,10,10a-octahydrophenanthrene-7-acetic acid. This product can be purified by sublimation at about 240° C. at 0.05 mm. pressure, followed by recrystallization from a mixture of chloroform and methanol. This lactone melts at about 285–292° C. and has absorption maxima in the ultraviolet region at 278 and 287 millimicrons with respective molecular extinction coefficients of about 2290 and 2140. The structural formula is

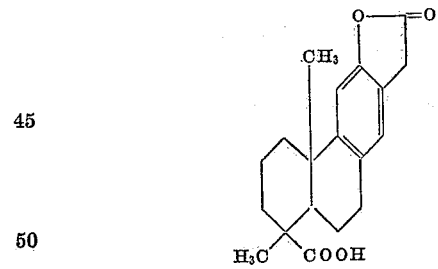

The methyl ester, that is the lactone of 1,4a-dimethyl-1-methoxycarbonyl-6-hydroxy-1,2,3,4,4a,9,10,10a-octahydrophenanthrene-7-acetic acid, is prepared by heating 10 parts of 1,4a-dimethyl-1-methoxycarbonyl-6-methoxy-1,2,3,4,4a,9,10,10a-octahydrophenanthrene-7-acetic acid, 20 parts of aluminum chloride, and 300 parts of chlorobenzene for 1 hour at about 80° C., followed by pouring the mixture into cold, dilute hydrochloric acid and removing the chlorobenzene by distillation under reduced pressure.

*Example 13*

In a low-pressure hydrogenation vessel is placed a mixture of 12.5 parts of methyl O-methyl-7-(α-methyl-β-carboxyvinyl)podocarpate, 1 part of a 5% palladium on charcoal catalyst, and 80 parts of ethanol. This mixture is shaken under a hydrogen atmosphere at a pressure of about 29 pounds per square inch for 18 hours. The catalyst is removed by filtration, and the solvent is distilled from the filtrate. The non-volatile yellow glass which is obtained as a residue is analyzed for any unreduced olefin by determining the ultraviolet absorption spectrum in methanolic solution at a concentration of 0.1 gram per liter. If there is any appreciable peak near 268 millimicrons, the hydrogenation step is repeated. The product can be used without further purification, or if further purification is desired, the material can be distilled from a short-path distillation apparatus at about 210° C. at a pressure of about 0.05 mm. This compound is 1,4a-dimethyl-1-methoxycarbonyl-6-methoxy-1,2,3,4,4a,9,10,10a-octahydrophenanthrene - 7 - β-methylpropionic acid of the structural formula

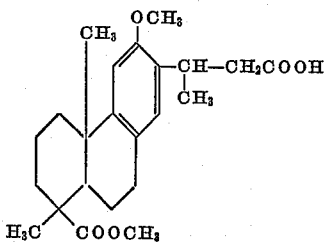

What is claimed is:

1. A member of the class consisting of compounds having the formula

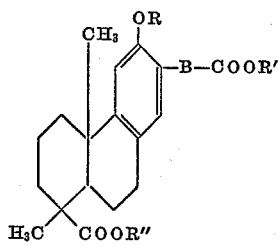

and compounds having the formula

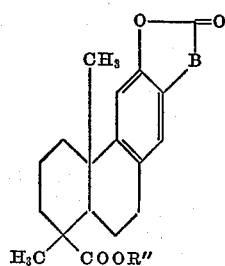

in which formulas R, R' and R'' are members of the group consisting of hydrogen and lower alkyl radicals, and B is a lower alkylene radical.

2. A compound of the formula

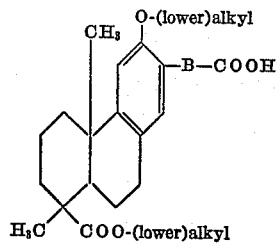

wherein B is a lower alkylene radical.

3. 1,4a - dimethyl - 1 - methoxycarbonyl-6-methoxy-1,2,3,4,4a,9,10,10a - octahydrophenanthrene - 7 - acetic acid.

4. 1,4a - dimethyl - 1 - methoxycarbonyl - 6 - methoxy-1,2,3,4,4a,9,10,10a - octahydrophenanthrene - 7 - propionic acid.

5. A compound of the formula

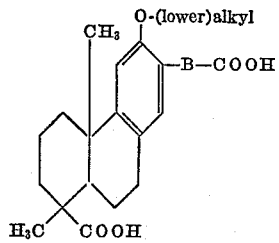

wherein B is a lower alkylene radical.

6. 1,4a - dimethyl - 1 - carboxy-6-methoxy-1,2,3,4,4a,9,10,10a - octahydrophenanthrene - 7 - propionic acid.

7. A compound of the formula

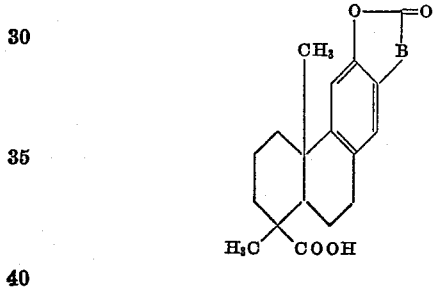

wherein B is a lower alkylene radical.

8. Lactone of 1,4a - dimethyl - 1 - carboxy - 6 - hydroxy - 1,2,3,4,4a,9,10,10a - octahydrophenanthrene - 7-acetic acid.

9. Lactone of 1,4a - dimethyl - 1 - carboxy - 6 - hydroxy - 1,2,3,4,4a,9,10,10a - octahydrophenanthrene - 7-propionic acid.

References Cited in the file of this patent

UNITED STATES PATENTS 2,767,162    Picha _____ Oct. 16, 1956

UNITED STATES PATENT OFFICE
CERTIFICATE OF CORRECTION

Patent No. 2,902,494                    September 1, 1959

Roy H. Bible, Jr.

It is hereby certified that error appears in the printed specification of the above numbered patent requiring correction and that the said Letters Patent should read as corrected below.

Column 1, line 70, for "alkonyl-podocarpate" read -- alkanoylpodocarpate column 2, line 44, for "carboxylic" read -- carboxyalkyl --.

Signed and sealed this 5th day of April 1960.

(SEAL)
Attest:

KARL H. AXLINE
Attesting Officer

ROBERT C. WATSON
Commissioner of Patents